United States Patent

Takahashi et al.

[11] Patent Number: 5,444,028
[45] Date of Patent: Aug. 22, 1995

[54] MICROWAVE DIELECTRIC CERAMIC COMPOSITION

[75] Inventors: Hisakazu Takahashi; Kenicki Ezaki; Yoko Baba; Kenichi Shibata, all of Osaka, Japan

[73] Assignee: Sanyo Electric Co., Ltd., Osaka, Japan

[21] Appl. No.: 342,012

[22] Filed: Nov. 16, 1994

Related U.S. Application Data

[62] Division of Ser. No. 186,869, Jan. 27, 1994, Pat. No. 5,423,796.

[30] Foreign Application Priority Data

Feb. 3, 1993 [JP] Japan ................... 5-016384
Dec. 21, 1993 [JP] Japan ................... 5-321542

[51] Int. Cl.⁶ ............................................ C04B 35/26
[52] U.S. Cl. ...................................................... 501/136
[58] Field of Search ........................................ 501/136

[56] References Cited

U.S. PATENT DOCUMENTS

5,188,993  2/1993  Takahashi et al. ............... 501/136

FOREIGN PATENT DOCUMENTS

60-119009  6/1985  Japan ................... 501/136
60-246259  12/1985 Japan ................... 501/136

*Primary Examiner*—David Brunsman
*Attorney, Agent, or Firm*—Armstrong, Westerman, Hattori, McLeland & Naughton

[57] ABSTRACT

In order to obtain a microwave dielectric ceramic composition having a high dielectric constant ($\epsilon r$) and a large Q value and having a temperature coefficient of resonance; frequency ($\tau f$) which is close to zero, the present invention is directed to a microwave dielectric ceramic composition expressed by a composition formula of $w \cdot Li_2O - x \cdot CaO - y \cdot A_2O_3 - z \cdot TiO_2$, wherein w, x, y and z are respectively in the ranges of 0.0 mole % $< w \leq 25.0$ mole %, 0.0 mole % $\leq x \leq 50.0$ mole %, 0.0 mole % $< y \leq 30.0$ mole %, 0.0 mole % $< z \leq 80.0$ mole % where $w+x+y+z=100$ mole %, and not more than 5 parts by weight of any one of ZnO, CoO, NiO and MgO is contained therein, and wherein A is selected from Sm and Nd.

2 Claims, No Drawings

MICROWAVE DIELECTRIC CERAMIC COMPOSITION

This is a division of application Ser. No. 08/186,869 filed Jan. 27, 1994, now U.S. Pat. No. 5,403,796.

BACKGROUND OF THE INVENTION

1. Field of the Invention

The present invention relates to dielectric ceramic compositions for use as resonators employed in a microwave frequency band of several gigahertz.

2. Description of the Prior Art

The recent increase in information density results in a progressively increased signal frequency used. Particularly, a microwave having a frequency of several hundred megahertz to several gigahertz is used in various information transmission media such as satellite communication, microwave remote communication, broadcasting, and further a microwave remote recognition system.

A resonator or a filter for a transmitter-receiver is indispensable in such media, and is manufactured using a dielectric ceramic material adequately performing a function in its high frequency band.

Examples of this type of dielectric ceramic material conventionally used include dielectric ceramic materials of a $BaO-TiO_2$ system, a $Ba(Zn_{\frac{1}{3}}(Nb \cdot Ta)_{\frac{2}{3}})O_3$ system, a $(Zr \cdot Sn)TiO_4$ system, and the like for the reason that the high frequency characteristics are relatively good.

In the resonator or the like made of the dielectric ceramic material, however, if the dielectric constant of its dielectric is taken as $\epsilon$, the wavelength of an electromagnetic wave propagating through the dielectric is small, i.e., $1/\sqrt{\epsilon}$. Consequently, the higher the dielectric constant $\epsilon$ of the material used is, the smaller the size of the resonator or the like can be.

However, the dielectric constant of the above described dielectic ceramic material is generally low, i.e., 20 to 40. Accordingly, the size of the resonator is increased in a microwave frequency band of 1 to 3 GHz.

On the other hand, examples of a material having a high dielectric constant include $SrTiO_3$ ($\epsilon$; about 300) and $CaTiO_3$ ($\epsilon i$; about 180). However, the temperature coefficients of resonance frequency $\epsilon f$ of the materials are respectively very high, i.e., $+1700$ ppm/°C. and $+800$ ppm/°C., so that the; stable use cannot be expected.

Examples of a method for bringing the temperature coefficient $\tau f$ of such a dielectric composition near zero include a method of mixing a dielectric ceramic material having a high dielectric constant and having a temperature coefficient $\tau f$ which is large on the positive side and a dielectric ceramic material having a high dielectric constant and having a temperature coefficient $\tau f$ which is large on the negative side.

However, a material having a high dielectric constant $\epsilon$ generally has a temperature coefficient $\tau f$ which is large on the plus side. Accordingly, it is impossible to find a suitable material having a high dielectric constant and having a temperature coefficient $\tau f$ which is minus, and it is difficult to make the Q value of the material larger as a microwave dielectric ceramic material.

In recent years, therefore, as a material solving the problems, a dielectric ceramic composition expressed by a composition formula of $w \cdot LiO_2 - x \cdot CaO - y \cdot D_2O_3 - z \cdot TiO_2$ (where D is Sm or Nd) which is disclosed in U.S. Pat. No 5,188,993 It is known that with respect to the dielectric ceramic material, good dielectric properties are obtained when the ranges of w, x, y and z are respectively 0.0 mole $\% < w \leq 25.0$ mole $\%$, 0.0 mole $\% < x \leq 50.0$ mole $\%$, 0.0 mole $\% < y \leq 20.0$ mole $\%$ and 0.0 mole $\% < z \leq 80.0$ mole $\%$, where $w+x+y+z=100$ mole $\%$ in the above described composition formula.

In a dielectric ceramic composition in a case where D is Nd in the above described composition formula, that is, a dielectric ceramic composition expressed by a composition formula of $w \cdot LiO_2 - x \cdot CaO - y \cdot Nd_2O_3 - z \cdot TiO_2$, it becomes clear that good dielectric properties are obtained even if a mixture ratio of Nd is more than 20 mole $\%$ and not more than 30 mole $\%$ that is 0.0 mole $\% < y \leq 30.0$ mole $\%$ and it can be expected that the same effect is obtained even if Nd is replaced with Sm.

Although the above described composition expressed by a composition formula of a $w \cdot LiO_2 - x \cdot CaO - y \cdot D_2O_3 - z \cdot TiO_2$ (where D is Sm or Nd) exhibits superior properties to the conventional materials, a further improvement in the properties has been desired.

SUMMARY OF THE INVENTION

In view of the above described points, an object of the present invention is to obtain a dielectric ceramic composition having a high dielectric constant and a large Q value and having a temperature coefficient of resonance frequency $\tau f$ which is close to zero.

In a microwave dielectric ceramic composition expressed by a composition formula of $w \cdot Li_2O - x \cdot CaO - y \cdot Sm_2O_3 - z \cdot TiO_2$, a first microwave dielectric ceramic composition according to the present invention is characterized in that the ranges of w, x, y and z are respectively 0.0 mole $\% < w \leq 25.0$ mole $\%$, 0.0 mole $\% < x \leq 50.0$ mole $\%$, 0.0 mole $\% < y \leq 30.0$ mole $\%$ and 0.0 mole $\% < z \leq 80.0$ mole $\%$, where $w+x y+z=100$ mole $\%$, and not more than 10 parts by weight of any one of $MnO_2$, $Bi_2O_3$, $Nb_2O_3$, $Ta_2O_5$ and $SnO_2$ is contained therein.

Not more than 10 parts by weight of any one of manganese oxide ($MnO_2$), bismuth oxide ($Bi_2O_3$), niobium oxide ($Nb_2O_3$), tantalum oxide ($Ta_2O_5$) and tin oxide ($SnO_2$) is contained in a mixture of lithium oxide ($Li_2O$), calcium oxide (CaO), samarium oxide ($Sm_2O_3$) and titanium oxide ($TiO_2$), thereby to obtain a microwave dielectric ceramic composition having a high dielectric constant $\epsilon r$ and a large Q value and having a low temperature coefficient $\tau f$.

In a microwave dielectric ceramic composition expressed by a composition formula of $w \cdot LiO_2 - x \cdot CaO - y \cdot Sm_2O_3 z \cdot TiO_2$, a second microwave dielectric ceramic composition according to the present invention is characterized in that the ranges of w, x, L; and z are respectively 0.0 mole $\% < w \leq 25.0$ mole $\%$, 0.0 mole $\% \leq x \leq 50.0$ mole $\%$ 0.0 mole $\% < y \leq 30.0$ mole $\%$ and 0.0 mole $\% < z \leq 80.0$ mole $\%$ where $w+x y+z=100$ mole $\%$, and more than zero to not more than 5 parts by weight of any one of ZnO, CoO, NiO and MgO is contained therein.

Not more than 5 parts by weight of any one of ZnO, CoO, NiO and MgO is contained in a mixture of lithium oxide ($LiO_2$), calcium oxide (CaO), samarium oxide ($Sm_2O_3$) and titanium oxide ($TiO_2$), thereby to obtain a microwave dielectric ceramic composition having a high dielectric constant $\epsilon r$ and a large Q value and having a low temperature coefficient $\tau f$.

In a microwave dielectric ceramic composition expressed by a composition formula of $w\cdot LiO_2 - x\cdot CaO - y\cdot Nd_2O_3 - z\cdot TiO_2$, a third microwave dielectric ceramic composition according to the present invention is characterized in that the ranges of w, x, y, and z are respectively 0.0 mole % $<$ w $\leq$ 25.0 mole %, 0.0 mole % $\leq$ x $\leq$ 50.0 mole %, 0.0 mole % $<$ y $\leq$ 30.0 mole % and 0.0 mole % $<$ z $\leq$ 80.0 mole %, where w+x+y+z=100 mole % and not more than 10 parts by weight of any one of $MnO_2$, $Bi_2O_3$, $Nb_2O_5$, $Ta_2O_5$ and $SnO_2$ is contained therein.

Not more than 10 parts by weight of any one of $MnO_2$, $Bi_2O_3$, $Nb_2O_5$, $Ta_2O_5$ and $SnO_2$ is contained in a mixture of lithium oxide ($Li_2O$), calcium oxide (CaO), neodymium oxide ($Nd_2O_3$) and titanium oxide ($TiO_2$), thereby to obtain a microwave dielectric ceramic composition having a high dielectric constant $\epsilon r$ and a large Q value and having a low temperature coefficient $\tau f$.

In a microwave dielectric ceramic composition expressed by a composition formula of $w\cdot Li_2O - x\cdot CaO - y\cdot Nd_2O_3 - z\cdot TiO_2$, a fourth microwave dielectric ceramic composition according to the present invention is characterized in that the ranges of w, x, y and z are respectively 0.0 mole % $<$ w $\leq$ 25.0 mole % 0.0 mole % $\leq$ x $\leq$ 50.0 mole %, 0.0 mole % $<$ y $\leq$ 30.0 mole %, and 0.0 mole % $<$ z $\leq$ 80.0 mole % where w+x+y+z=100 mole % and more then zero to not more than 5 parts by weight of any one of ZnO, CoO, NiO and MgO is contained therein.

Not more than 5 parts by weight of any one of ZnO, CoO, NiO and MgO is contained in a mixture of lithium oxide ($Li_2O$), calcium oxide (CaO), neodymium oxide ($Nd_2O_3$) and titanium oxide ($TiO_2$), thereby to obtain a microwave dielectric ceramic composition having a high dielectric constant $\epsilon r$ and a large Q value and having a low temperature coefficient $\tau f$.

As described in the foregoing, according to each of the embodiments of the present invention, it is possible to obtain a microwave dielectric ceramic composition having a high dielectric constant and a large Q value and having a temperature coefficient $\tau f$ which is close to zero in a microwave frequency band.

Consequently, a resonator or the like constituted by the above described microwave dielectric ceramic composition according to the present invention can be miniaturized and can be employed under high reliability even in the use conditions in which temperature changes are relatively large.

The foregoing and other objects, features, aspects and advantages of the present invention will become more apparent from the following detailed description of the present invention.

DESCRIPTION OF THE PREFERRED EMBODIMENTS

In order to make the present invention clearer, suitable embodiments of the present invention will be described in detail. However, the present invention is not limited to the embodiments and also includes a range which is obvious from its true intent.

Description is now made of a microwave dielectric ceramic composition expressed by a composition formula of $w\cdot LiO_2 - x\cdot CaO - y\cdot Sm_2O_3 - z\cdot TiO_2$ according to a suitable embodiment of the present invention.

In manufacturing processes of the microwave dielectric ceramic composition according to the suitable embodiment, powders of $Li_2CO_3$, $CaCO_3$, $Sm_2O_3$ and $TiO_2$ which are raw materials were first prepared, and were weighed and mixed so as to be predetermined molar fractions, respectively.

As one example, the powders of $Li_2O$, CaO, $Sm_2O_3$ and $TiO_2$ are so weighed and mixed that the respective molar fractions are 9 mole %, 16 mole %, 12 mole % and 63 mole %. 3 parts by weight of $HnO_2$ is weighed and mixed as manganese oxide, as shown in a column of a sample number 3 in Table 1 as appended later.

The mixed powder was then blended in a ball mill over 5 to 20 hours by the wet blending using alcohol and then, was calcined at temperatures of 700° to 1000° C. for 1 to 5 hours. Thereafter, the calcined powder thus obtained was ground using the ball mill for 2 to 50 hours.

The ground calcined powder was then granulated after an organic binder such as polyvinyl alcohol was added thereto, was classified and then, was formed so as to have predetermined dimensions and a predetermined shape by applying a pressure of 2000 to 3000 kg/cm². A forming member obtained was sintered at temperatures of 1200° to 1400° C. for 1 to 5 hours and then, both surfaces of the sintered forming member were so polished that the thickness of the sintered forming member becomes approximately one-half of the diameter thereof, thereby to complete a sample to be measured having the above described composition.

The dielectric constant ($\epsilon r$), the Q value and the temperature coefficient of resonance frequency ($\tau f$) were measured in the neighborhood of the measurement frequency of 3 GHz using the Hakki-Coleman method with respect to the sample thus completed. The results of the measurements are shown in Table 1.

Samples to be measured which differ in mixture ratio in a case where $MnO_2$ is mixed or $Bi_2O_3$ is mixed in place of $MnO_2$ as bismuth oxide as shown in respective columns of the other sample numbers in Table 1 were prepared in the same manner, and the dielectric constant ($\epsilon r$), the Q value and the temperature coefficient of resonance frequency ($\tau f$) were measured in the neighborhood of the measurement frequency of 3 GHz with respect to the samples to be measured. Table 1 also shows the results of the measurements.

[TABLE 1]

| | Dielectric Properties of Ceramics of a $w\cdot Li_2O - x\cdot CaO - y\cdot Sm_2O_3 - z\cdot TiO_2$ System (additive; $MnO_2$, $Bi_2O_3$) | | | | | | | | |
|---|---|---|---|---|---|---|---|---|---|
| sample number | composition ratio (mole %) | | | | additive | part by weight | $\epsilon r$ | Q | $\tau f$ |
| | w | x | y | z | | | | | |
| 1* | 9 | 16 | 12 | 63 | no | 0 | 105 | 1500 | +9 |
| 2 | 9 | 16 | 12 | 63 | $MnO_2$ | 1 | 105 | 1600 | +10 |
| 3 | 9 | 16 | 12 | 63 | " | 3 | 100 | 1740 | +12 |
| 4 | 9 | 16 | 12 | 63 | " | 5 | 96 | 1700 | +6 |
| 5 | 9 | 16 | 12 | 63 | " | 10 | 92 | 1520 | −6 |
| 6* | 9 | 16 | 12 | 63 | " | 15 | 84 | 470 | −25 |
| 7 | 9 | 16 | 12 | 63 | $Bi_2O_3$ | 1 | 104 | 1700 | +16 |
| 8 | 9 | 16 | 12 | 63 | " | 3 | 104 | 1800 | +14 |
| 9 | 9 | 16 | 12 | 63 | " | 5 | 100 | 1640 | +5 |
| 10 | 9 | 16 | 12 | 63 | " | 10 | 97 | 1530 | −9 |
| 11* | 9 | 16 | 12 | 63 | " | 15 | 92 | 350 | −22 |
| 12* | 9 | 17 | 11 | 63 | no | 0 | 108 | 1200 | +29 |
| 13 | 9 | 17 | 11 | 63 | $MnO_2$ | 3 | 99 | 1350 | +21 |
| 14 | 9 | 17 | 11 | 63 | " | 5 | 96 | 1600 | +13 |
| 15* | 9 | 17 | 11 | 63 | " | 15 | 80 | 350 | +7 |
| 16 | 9 | 17 | 11 | 63 | $Bi_2O_3$ | 3 | 109 | 1650 | +27 |
| 17 | 9 | 17 | 11 | 63 | " | 5 | 106 | 1530 | +18 |
| 18* | 9 | 17 | 11 | 63 | " | 15 | 88 | 320 | +12 |
| 19* | 8 | 17 | 12 | 63 | no | 0 | 104 | 1500 | +7 |
| 20 | 8 | 17 | 12 | 63 | $MnO_2$ | 3 | 95 | 1050 | +4 |
| 21 | 8 | 17 | 12 | 63 | " | 5 | 93 | 1960 | +3 |
| 22* | 8 | 17 | 12 | 63 | " | 15 | 78 | 430 | −21 |
| 23 | 8 | 17 | 12 | 63 | $Bi_2O_3$ | 3 | 101 | 1730 | +8 |

[TABLE 1]-continued

Dielectric Properties of Ceramics of a
w · Li$_2$O − x · CaO − y · Sm$_2$O$_3$ − z · TiO$_2$
System (additive; MnO$_2$, Bi$_2$O$_3$)

| sample number | \multicolumn{4}{c}{composition ratio (mole %)} | | | | additive | part by weight | εr | Q | τf |
|---|---|---|---|---|---|---|---|---|
| | w | x | y | z | | | | |
| 24 | 8 | 17 | 12 | 63 | " | 5 | 98 | 1680 | −5 |
| 25* | 9 | 17 | 11 | 63 | " | 15 | 80 | 390 | +12 |
| 26* | 13 | 16 | 11 | 60 | no | 0 | 110 | 1570 | +27 |
| 27 | 13 | 16 | 11 | 60 | MnO$_2$ | 3 | 102 | 1010 | +19 |
| 28 | 13 | 16 | 11 | 60 | Bi$_2$O$_3$ | 3 | 109 | 1630 | +25 |
| 29* | 13 | 10 | 14 | 63 | no | 0 | 95 | 1500 | +5 |
| 30 | 13 | 10 | 14 | 63 | MnO$_2$ | 3 | 91 | 2100 | −6 |
| 31 | 13 | 10 | 14 | 63 | Bi$_2$O$_3$ | 3 | 93 | 1710 | −4 |

Note) In Table 1, asterisked samples are samples beyond the range of the present invention, and the unit of τf is ppm/°C.

As can be seen from Table 1, the dielectric constant εr is slightly decreased, while the Q value is effectively increased by containing MnO$_2$ or Bi$_2$O$_3$. Particularly, the Q value takes maximum value when the content is in the vicinity of 3 to 5 parts by weight. However, the Q value is rapidly decreased if the content exceeds 10 parts by weight.

On the other hand, the absolute value of the temperature coefficient τf is low, i.e., not more than 30 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole % 0.0 mole % ≦ x ≦ 50.0 mole % 0.0 mole % < y ≦ 30.0 mole % and 0.0 mole % < z ≦ 80.0 mole %, where w+x+y+z=100 mole %.

In the present embodiment, the content of MnO$_2$ or Bi$_2$O$_3$ (bismuth dioxide) is adjusted, thereby to make it possible to obtain a dielectric suitable for a microwave band. The content is thus suitably adjusted, thereby to make it possible to make the Q value large, although the dielectric constant is slightly decreased in a state where the temperature coefficient is kept low.

Although in the present embodiment, manganese dioxide is used as manganese oxide, the present invention is not limited to the same. Even if manganese oxide which differs in valence such as manganese monoxide or manganese sesquioxide is used, exactly the same effect is produced. The same is true for bismuth oxide.

Description is now made of an embodiment in which in a microwave dielectric ceramic composition expressed by a composition formula of w·LiO$_2$−x·CaO−y·Sm$_2$O$_3$−z·TiO$_2$, Nb$_2$O$_5$ or Ta$_2$O$_5$ is used as an additive.

The additive is formed in exactly the same manner as that in the above described embodiment. Samples to be measured which differ in mixture ratio in a case where Nb$_2$O$_5$ or Ta$_2$O$_5$ is mixed as shown in respective columns of sample numbers in Table 2 were prepared, and the dielectric constant (εr), the Q value and the temperature coefficient of resonance frequency (τf) were measured in the neighborhood of the measurement frequency of 3 GHz with respect to the samples to be measured. Table 2 also shows the results of the measurements.

[TABLE 2]

Dielectric Properties of Ceramics of a
w · Li$_2$O − x · CaO − y · Sm$_2$O$_3$ − z · TiO$_2$
System (additive; Nb$_2$O$_5$, Ta$_2$O$_5$)

| sample number | w | x | y | z | additive | part by weight | εr | Q | τf |
|---|---|---|---|---|---|---|---|---|---|
| 1* | 9 | 16 | 12 | 63 | no | 0 | 105 | 1500 | +9 |
| 2 | 9 | 16 | 12 | 63 | Ta$_2$O$_5$ | 1 | 105 | 1650 | +11 |
| 3 | 9 | 16 | 12 | 63 | " | 3 | 103 | 1870 | +15 |
| 4 | 9 | 16 | 12 | 63 | " | 5 | 100 | 1700 | +7 |
| 5 | 9 | 16 | 12 | 63 | " | 10 | 98 | 1550 | −10 |
| 6* | 9 | 16 | 12 | 63 | " | 15 | 88 | 400 | −25 |
| 7 | 9 | 16 | 12 | 63 | Nb$_2$O$_5$ | 1 | 104 | 1700 | +11 |
| 8 | 9 | 16 | 12 | 63 | " | 3 | 103 | 1800 | +9 |
| 9 | 9 | 16 | 12 | 63 | " | 5 | 101 | 1640 | +6 |
| 10 | 9 | 16 | 12 | 63 | " | 10 | 95 | 1530 | −12 |
| 11* | 9 | 16 | 12 | 63 | " | 15 | 84 | 350 | −22 |
| 12* | 9 | 17 | 11 | 63 | no | 0 | 108 | 1200 | +29 |
| 13 | 9 | 17 | 11 | 63 | Ta$_2$O$_5$ | 3 | 105 | 1900 | +21 |
| 14 | 9 | 17 | 11 | 63 | " | 5 | 103 | 1500 | +15 |
| 15* | 9 | 17 | 11 | 63 | " | 15 | 84 | 400 | +9 |
| 16 | 9 | 17 | 11 | 63 | Nb$_2$O$_5$ | 3 | 104 | 1850 | +20 |
| 17 | 9 | 17 | 11 | 63 | " | 5 | 100 | 1430 | +14 |
| 18* | 9 | 17 | 11 | 63 | " | 15 | 85 | 380 | +8 |
| 19* | 8 | 17 | 12 | 63 | no | 0 | 104 | 1500 | +7 |
| 20 | 8 | 17 | 12 | 63 | Ta$_2$O$_5$ | 3 | 100 | 2010 | +5 |
| 21 | 8 | 17 | 12 | 63 | " | 5 | 98 | 1830 | +4 |
| 22* | 8 | 17 | 12 | 63 | " | 15 | 84 | 470 | −14 |
| 23 | 8 | 17 | 12 | 63 | Nb$_2$O$_5$ | 3 | 99 | 1830 | +6 |
| 24 | 8 | 17 | 12 | 63 | " | 5 | 96 | 1710 | −3 |
| 25* | 9 | 17 | 11 | 63 | " | 15 | 79 | 430 | −21 |
| 26* | 13 | 16 | 11 | 60 | no | 0 | 110 | 1570 | +27 |
| 27 | 13 | 16 | 11 | 60 | Ta$_2$O$_5$ | 3 | 108 | 1920 | +24 |
| 28 | 13 | 16 | 11 | 60 | Nb$_2$O$_5$ | 3 | 107 | 1840 | +22 |
| 29* | 13 | 10 | 14 | 63 | no | 0 | 95 | 1500 | +5 |
| 30 | 13 | 10 | 14 | 63 | Ta$_2$O$_5$ | 3 | 92 | 1840 | +3 |
| 31 | 13 | 10 | 14 | 63 | Nb$_2$O$_5$ | 3 | 91 | 1810 | −2 |

Note) In table 2, asterisked samples are samples beyond the range of the present invention, and the unit of τf is ppm/°C.

As can be seen from Table 2, the dielectric constant εr is slightly decreased, while the Q value is effectively increased by containing Nb$_2$O$_5$ or Ta$_2$O$_5$. Particularly, the Q value takes maximum value when the content is in the vicinity of 3 to 5 parts by weight. However, the Q value is rapidly decreased if the content exceeds 10 parts by weight.

On the other hand, the absolute value of the temperature coefficient of is low, i.e., not more than 30 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole % 0.0 mole % ≦ x ≦ 50.0 mole % 0.0 mole % < y ≦ 30.0 mole %, and 0.0 mole % < z ≦ 80.0 mole %, where w+x+y+z=100 mole %.

In the present embodiment, the content of Nb$_2$O$_5$ or Ta$_2$O$_5$ is adjusted, thereby to make it possible to obtain a dielectric suitable for a microwave band. The content is thus suitably adjusted, thereby to make it possible to make the Q value large, although the dielectric constant is slightly decreased in a state-where the temperature coefficient is kept low.

Description is now made of an embodiment in which in a microwave dielectric ceramic composition expressed by a composition formula of w·LiO$_2$−x·CaO−y·Sm$_2$O$_3$−z·TiO$_2$ as in the above described embodiment, SnO$_2$ is used as an additive.

The additive is formed in the same manner as that in the above described embodiment. Samples to be measured which differ in mixture ratio in a case where SnO$_2$ is mixed as shown in respective columns of sample numbers in Table 3 were prepared, and the dielectric constant ($\epsilon r$), the Q value and the temperature coefficient of resonance frequency ($\tau f$) were measured in the neighborhood of the measurement frequency of 3 GHz with respect to the samples to be measured. Table 3 also shows the results of the measurements.

[TABLE 3]

Dielectric Properties of Ceramics of a
$w \cdot Li_2O - x \cdot CaO - y \cdot Sm_2O_3 - z \cdot TiO_2$
System (additive; $SnO_2$)

| sample | composition ratio (mole %) | | | | addi- | part by | | | |
|---|---|---|---|---|---|---|---|---|---|
| number | w | x | y | z | tive | weight | $\epsilon r$ | Q | $\tau f$ |
| 1* | 9 | 16 | 12 | 63 | no | 0 | 105 | 1500 | +9 |
| 2 | 9 | 16 | 12 | 63 | $SnO_2$ | 1 | 102 | 1860 | +7 |
| 3 | 9 | 16 | 12 | 63 | " | 3 | 97 | 1960 | +5 |
| 4 | 9 | 16 | 12 | 63 | " | 5 | 95 | 1750 | +4 |
| 5 | 9 | 16 | 12 | 63 | " | 10 | 90 | 1660 | +7 |
| 6* | 9 | 16 | 12 | 63 | " | 15 | 82 | 550 | — |
| 7* | 13 | 10 | 14 | 63 | no | 0 | 95 | 1500 | +5 |
| 8 | 13 | 10 | 14 | 63 | $SnO_2$ | 3 | 93 | 1880 | +3 |
| 9 | 13 | 10 | 14 | 63 | " | 5 | 90 | 1800 | −4 |
| 10* | 13 | 10 | 14 | 63 | " | 15 | 77 | 450 | — |

Note) In table 3, asterisked samples are samples beyond the range of the present invention, and — indicates "unmeasurable", and the unit of $\tau f$ is ppm/°C.

As can be seen from Table 3, the dielectric constant $\epsilon r$ is slightly decreased, while the Q value is effectively increased by a maximum of 30 % by containing $SnO_2$. Particularly, the Q value takes maximum value when the content is in the vicinity of 3 to 5 parts by weight. However, the Q value is rapidly decreased if the content is not less than 10 parts by weight.

On the other hand, the absolute value of the temperature coefficient of is low, i.e., not more than 10 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole % 0.0 mole % ≦ x ≦ 50.0 mole %, 0.0 mole % < y ≦ 30.0 mole % and 0.0 mole % < z ≦ 80.0 mole % where w+x+y+z=100 mole %.

In the present embodiment, the content of $SnO_2$ is adjusted, thereby to make it possible to obtain a dielectric suitable for a microwave band. The content is thus suitably adjusted, thereby to make it possible to make the Q value large, although the dielectric constant is slightly decreased in a state where the temperature coefficient is kept low.

Description is now made of an embodiment in which in a microwave dielectric ceramic composition expressed by a composition formula of w·$LiO_2$−x·CaO−y·$Sm_2O_3$−z·$TiO_2$ as in the above described embodiment, zinc oxide (ZnO), cobalt oxide (CoO), nickel oxide (NiO) or magnesium oxide (MgO) is used as an additive.

The additive is formed in the same manner as that in the above described embodiment. Samples to be measured which differ in mixture ratio in a case where ZnO, CoO, NiO or MgO is mixed as shown in respective columns of sample numbers in Table 4 were prepared, and the dielectric constant ($\epsilon r$), the Q value and the temperature coefficient of resonance frequency ($\tau f$) were measured in the neighborhood of the measurement frequency of 3 GHz with respect to the samples to be measured. Table 4 also shows the results of the measurements.

[TABLE 4]

Dielectric Properties of Ceramics of a
$w \cdot Li_2O - x \cdot CaO - y \cdot Sm_2O_3 - z \cdot TiO_2$
System (additive; ZnO, CoO, NiO, MgO)

| sample | composition ratio (mole %) | | | | addi- | part by | | | |
|---|---|---|---|---|---|---|---|---|---|
| number | w | x | y | z | tive | weight | $\epsilon r$ | Q | $\tau f$ |
| 1* | 9 | 16 | 12 | 63 | no | 0 | 105 | 1500 | +9 |
| 2 | 9 | 16 | 12 | 63 | ZnO | 1.5 | 97 | 1940 | +6 |
| 3 | 9 | 16 | 12 | 63 | " | 3 | 83 | 2290 | −4 |
| 4 | 9 | 16 | 12 | 63 | " | 5 | 78 | 2350 | −20 |
| 5 | 9 | 16 | 12 | 63 | " | 10 | 62 | 1950 | −28 |
| 6* | 9 | 16 | 12 | 63 | " | 15 | 43 | 1150 | −45 |
| 7 | 9 | 16 | 12 | 63 | CoO | 1.5 | 98 | 1890 | +7 |
| 8 | 9 | 16 | 12 | 63 | " | 3 | 85 | 2050 | +4 |
| 9 | 9 | 16 | 12 | 63 | " | 5 | 80 | 2250 | −14 |
| 10 | 9 | 16 | 12 | 63 | " | 10 | 66 | 1910 | −25 |
| 11* | 9 | 16 | 12 | 63 | " | 15 | 45 | 1540 | −41 |
| 12 | 9 | 16 | 12 | 63 | NiO | 1.5 | 100 | 1880 | +13 |
| 13 | 9 | 16 | 12 | 63 | " | 3 | 89 | 2050 | +7 |
| 14 | 9 | 16 | 12 | 63 | " | 5 | 83 | 2230 | −16 |
| 15 | 9 | 16 | 12 | 63 | " | 10 | 69 | 1850 | −28 |
| 16* | 9 | 16 | 12 | 63 | " | 15 | 50 | 1430 | −48 |
| 17 | 9 | 16 | 12 | 63 | MgO | 1.5 | 92 | 2010 | −8 |
| 18 | 9 | 16 | 12 | 63 | " | 3 | 80 | 2340 | −15 |
| 19 | 9 | 16 | 12 | 63 | " | 5 | 75 | 2400 | −24 |
| 20 | 9 | 16 | 12 | 63 | " | 10 | 58 | 2130 | −30 |
| 21* | 9 | 16 | 12 | 63 | " | 15 | 40 | 1530 | −55 |

Note) In Table 4, asterisked samples are samples beyond the range of the present invention, and the unit of $\tau f$ is ppm/°C.

As can be seen from Table 4, the dielectric constant $\epsilon r$ is slightly decreased, while the Q value is greatly increased by containing any one of ZnO, CoO, NiO and MgO. Particularly, the Q value takes maximum value when the content is in the vicinity of 3 to 5 parts by weight. However, the dielectric constant $\epsilon r$ is extremely decreased if the content exceeds 5 parts by weight.

Furthermore, the absolute value of the temperature coefficient $\tau f$ is low, i.e., not more than 30 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole %, 0.0 mole % ≦ x ≦ 50.0 mole %, 0.0 mole % < y ≦ 30.0 mole %, and 0.0 mole % < z ≦ 80.0 mole % where w+x+y+z=100 mole %.

In the present embodiment, the content of ZnO, CoO, NiO or MgO is adjusted, thereby to make it possible to obtain a dielectric suitable for a microwave band. The content is thus suitably adjusted, thereby to make it possible to make the Q value large, although the dielectric constant is slightly decreased in a state where the temperature coefficient is kept low.

As described in the foregoing, when the microwave dielectric ceramic composition in each of the above described embodiments of the present invention is used for, for example, a resonator, the additive may be suitably selected and used in consideration of the above described tendency in a case where the content of the additive is changed.

Furthermore, when the microwave dielectric ceramic composition in each of the above described embodiments of the present invention is utilized for a microwave, it is fit for practical use even if the dielectric constant is low particularly when the Q value and the temperature coefficient are important design parameters.

Description is now made of a microwave dielectric ceramic composition expressed by a composition formula of $w \cdot Li_2O - x \cdot CaO - y \cdot Nd_2O_3 - z \cdot TiO_2$ according to a suitable embodiment of the present invention.

In manufacturing processes of the microwave dielectric ceramic composition according to the suitable embodiment, powders of $Li_2CO_3$, $CaCO_3$, $Nd_2O_3$ and $TiO_2$ which are raw materials were prepared, and were weighed and mixed so as to be predetermined molar fractions, respectively.

As one example, the powders of $Li_2O$, $CaO$, $Nd_2O_3$ and $TiO_2$ were so weighed and mixed that the respective molar fractions are 9 mole %, 16 mole %, 12 mole % and 63 mole % parts by weight of $MnO_2$ was weighed and mixed, as shown in a column of a sample number 3 in Table 5 as appended later.

The mixed powder was then blended in a ball mill over 5 to 20 hours by the wet blending using alcohol arid then, was calcined at temperatures of 700° to 1000° C. for 1 to 5 hours. Thereafter, the calcined powder thus obtained was ground using the ball mill for 2 to 50 hours.

The ground calcined powder was granulated after an organic binder such as polyvinyl alcohol was added thereto, was classified and then, was formed so as to have predetermined dimensions and a predetermined shape by applying a pressure of 2000 to 3000 kg/cm². A forming member obtained was sintered at temperatures of 1200° to 1400° C. for 1 to 5 hours and then, both surfaces of the sintered forming member were so polished that the thickness of the sintered forming member becomes approximately one-half of the diameter thereof, thereby to complete a sample to be measured having the above described composition.

The dielectric constant ($\epsilon r$), tile Q value and the temperature coefficient of resonance frequency ($\tau f$) were measured in the neighborhood of the measurement frequency of 3 GHz using the Hakki-Coleman method with respect to the sample thus completed. The results of the measurements are shown in Table 5.

Samples to be measured which differ in mixture ratio in a case where $MnO_2$ is mixed or $Bi_2O_3$ is mixed in place of $MnO_2$ as shown in respective columns of the other sample numbers in Table 5 were prepared in the same manner, and the dielectric constant ($\epsilon r$), the Q value and the temperature coefficient of resonance frequency ($\tau f$) in the neighborhood of the measurement frequency of 3 GHz were measured with respect to the samples to be measured. Table 5 also shows the results of the measurements.

[TABLE 5]

Dielectric Properties of Ceramics of a
$w \cdot Li_2O - x \cdot CaO - y \cdot Nd_2O_3 - z \cdot TiO_2$
System (additive; $MnO_2$, $Bi_2O_3$)

| sample number | composition ratio (mole %) | | | | additive | part by weight | $\epsilon r$ | Q | $\tau f$ |
|---|---|---|---|---|---|---|---|---|---|
| | w | x | y | z | | | | | |
| 1* | 9 | 12 | 11.5 | 67.5 | no | 0 | 122 | 750 | +15 |
| 2 | 9 | 12 | 11.5 | 67.5 | $MnO_2$ | 1.5 | 118 | 920 | +11 |
| 3 | 9 | 12 | 11.5 | 67.5 | " | 3 | 114 | 1220 | +9 |
| 4 | 9 | 12 | 11.5 | 67.5 | " | 5 | 108 | 900 | −10 |
| 5 | 9 | 12 | 11.5 | 67.5 | " | 10 | 100 | 770 | −15 |
| 6* | 9 | 12 | 11.5 | 67.5 | " | 15 | 93 | 270 | — |
| 7 | 9 | 12 | 11.5 | 67.5 | $Bi_2O_3$ | 1.5 | 121 | 850 | +14 |
| 8 | 9 | 12 | 11.5 | 67.5 | " | 3 | 119 | 1050 | +11 |
| 9 | 9 | 12 | 11.5 | 67.5 | " | 5 | 115 | 870 | −5 |
| 10 | 9 | 12 | 11.5 | 67.5 | " | 10 | 108 | 760 | −12 |
| 11* | 9 | 12 | 11.5 | 67.5 | " | 15 | 92 | 230 | — |
| 12* | 3.5 | 8 | 18 | 70.5 | no | 0 | 94 | 1550 | −2 |
| 13 | 3.5 | 8 | 18 | 70.5 | $MnO_2$ | 3 | 90 | 2030 | −9 |
| 14 | 3.5 | 8 | 18 | 70.5 | " | 5 | 88 | 1700 | −16 |
| 15* | 3.5 | 8 | 18 | 70.5 | " | 15 | 71 | 400 | — |
| 16 | 3.5 | 8 | 18 | 70.5 | $Bi_2O_3$ | 3 | 93 | 1850 | −7 |
| 17 | 3.5 | 8 | 18 | 70.5 | " | 5 | 91 | 1630 | −14 |
| 18* | 3.5 | 8 | 18 | 70.5 | " | 15 | 81 | 320 | — |

Note) In table 5, asterisked samples are samples beyond the range of the present invention, — indicates "unmeasurable", and the unit of $\tau f$ is ppm/°C.

As can be seen from Table 5, the dielectric constant $\epsilon r$ is slightly decreased, while the Q value is effectively increased by containing $MnO_2$ or $Bi_2O_3$. Particularly, the Q value takes maximum value when the content is in the vicinity of 3 to 5 parts by weight. However, the Q value is rapidly decreased if the content exceeds 10 parts by weight.

On the other hand, the absolute value of the temperature coefficient of is low, i.e., not more than 30 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole %, 0.0 mole % < x ≦ 50.0 mole %, 0.0 mole % < y ≦ 30.0 mole % and 0.0 mole % < z ≦ 80.0 mole %, where w+x+y+z = 100 mole %.

Although in the present embodiment, the content of $MnO_2$ or $Bi_2O_3$ is adjusted, thereby to make it possible to obtain a dielectric suitable for a microwave band, the content is thus suitably adjusted, thereby to make it possible .to make the Q value large, although the dielectric constant is slightly decreased in a state where the temperature coefficient is kept low.

Although in the present embodiment, manganese dioxide is used as manganese oxide, the present invention is not limited to the same. Even if manganese oxide which differ in valence such as manganese monoxide or manganese sesquioxide is used, entirely the same effect is produced. The same is true for bismuth oxide.

Description is now made of an embodiment in which in a microwave dielectric ceramic composition expressed by a composition formula of $w \cdot LiO_2 - x \cdot CaO - y \cdot Nd_2O_3 - z \cdot TiO_2$ as in the above described embodiment, $Nb_2O_5$ or $Ta_2O_5$ is used as an additive.

The additive is formed in the stone manner as that in the above described embodiment. Samples to be measured which differ in mixture ratio in a case where $Nb_2O_5$ or $Ta_2O_5$ is mixed as shown in respective columns of sample numbers in Table 6 were prepared, and the dielectric constant ($\epsilon r$), the Q value and the temperature coefficient of resonance frequency ($\tau f$) were measured in the neighborhood of the measurement frequency of 3 GHz with respect to the samples to be measured. Table 6 also shows the results of the measurements.

[TABLE 6]

Dielectric Properties of Ceramics of a
$w \cdot Li_2O - x \cdot CaO - y \cdot Nd_2O_3 - z \cdot TiO_2$
System (additive; $Nb_2O_5$, $Ta_2O_5$)

| sample number | composition ratio (mole %) | | | | additive | part by weight | $\epsilon r$ | Q | $\tau f$ |
|---|---|---|---|---|---|---|---|---|---|
| | w | x | y | z | | | | | |
| 1* | 9 | 12 | 11.5 | 67.5 | no | 0 | 122 | 750 | +15 |

[TABLE 6]-continued

Dielectric Properties of Ceramics of a
w · Li₂O — x · CaO — y · Nd₂O₃ — z · TiO₂
System (additive; Nb₂O₅, Ta₂O₅)

| sample number | composition ratio (mole %) w | x | y | z | additive | part by weight | εr | Q | τf |
|---|---|---|---|---|---|---|---|---|---|
| 2 | 9 | 12 | 11.5 | 67.5 | Ta₂O₅ | 1.5 | 120 | 1150 | +13 |
| 3 | 9 | 12 | 11.5 | 67.5 | " | 3 | 117 | 1170 | +11 |
| 4 | 9 | 16 | 11.5 | 67.5 | " | 5 | 110 | 850 | −7 |
| 5 | 9 | 12 | 11.5 | 67.5 | " | 10 | 103 | 650 | −15 |
| 6* | 9 | 12 | 11.5 | 67.5 | " | 15 | 97 | 250 | — |
| 7 | 9 | 12 | 11.5 | 67.5 | Nb₂O₅ | 1.5 | 120 | 1160 | +14 |
| 8 | 9 | 12 | 11.5 | 67.5 | " | 3 | 119 | 1190 | +12 |
| 9 | 9 | 12 | 11.5 | 67.5 | " | 5 | 111 | 880 | −5 |
| 10 | 9 | 12 | 11.5 | 67.5 | " | 10 | 101 | 670 | −14 |
| 11* | 9 | 12 | 11.5 | 67.5 | " | 15 | 92 | 310 | — |
| 12* | 3.5 | 8 | 18 | 70.5 | no | 0 | 94 | 1550 | −2 |
| 13 | 3.5 | 8 | 18 | 70.5 | Ta₂O₅ | 3 | 93 | 1930 | −9 |
| 14 | 3.5 | 8 | 18 | 70.5 | " | 5 | 90 | 1650 | −16 |
| 15* | 3.5 | 8 | 18 | 70.5 | " | 15 | 79 | 350 | — |
| 16 | 3.5 | 8 | 18 | 70.5 | Nb₂O₅ | 3 | 92 | 1950 | −7 |
| 17 | 3.5 | 8 | 18 | 70.5 | " | 5 | 88 | 1680 | −14 |
| 18* | 3.5 | 8 | 18 | 70.5 | " | 15 | 76 | 340 | — |
| 19* | 11 | 16 | 12 | 61 | no | 0 | 131 | 1000 | +38 |
| 20 | 11 | 16 | 12 | 61 | Ta₂O₅ | 3 | 127 | 1230 | +30 |
| 21 | 11 | 16 | 12 | 61 | " | 5 | 122 | 1100 | +25 |
| 22* | 11 | 16 | 12 | 61 | " | 15 | 113 | 240 | — |
| 23 | 11 | 16 | 12 | 61 | Nb₂O₅ | 3 | 128 | 1250 | +29 |
| 24 | 11 | 16 | 12 | 61 | " | 5 | 125 | 1090 | +23 |
| 25* | 11 | 16 | 12 | 61 | " | 15 | 110 | 260 | — |
| 26* | 3.5 | 12 | 12 | 72.5 | no | 0 | 103 | 1030 | +24 |
| 27 | 3.5 | 12 | 12 | 72.5 | Ta₂O₅ | 3 | 101 | 1290 | +19 |
| 28 | 3.5 | 12 | 12 | 72.5 | Nb₂O₅ | 3 | 100 | 1310 | +17 |

Note) In Table 1, asterisked samples are samples beyond the range of the present invention, — indicated "unmeasureable", and the unit of τf is ppm/°C.

As can be seen from Table 6, the dielectric constant εr is slightly decreased, while the Q value is effectively increased by containing Nb₂O₅ or Ta₂O₅. Particularly, the Q value takes maximum value when the content is in the vicinity of 3 to 5 parts by weight. However, the Q value is rapidly decreased if the content exceeds 10 parts by weight.

On the other hand, the absolute value of the temperature coefficient τf is low, i.e., not more than 30 ppm/°C., thereby to obtain a good ceramic composition.

The ranges of w, x, y and z in the microwave dielectric ceramic composition having a composition according to the present embodiment can be respectively $0.0$ mole $\% < w \leq 25.0$ mole %, $0.0$ mole $\% < x \leq 50.0$ mole %, $0.0$ mole $\% < y \leq 30.0$ mole %, and $0.0$ mole $\% < z \leq 80.0$ mole %, where $w+x+y+z=100$ mole %.

In the present embodiment, the content of Nb₂O₅ or Ta₂O₅ is adjusted, thereby to make it possible to obtain a dielectric suitable for a microwave band. The content is thus suitably adjusted, thereby to make it possible to make the Q value large, although the dielectric constant is slightly decreased in a state where the temperature coefficient is kept low.

Description is now made of an embodiment in which in a microwave dielectric ceramic composition expressed By a composition formula of w·Li₂O−x·CaO−y·Nd₂O₃−z· TiO₂ as in the above described embodiment, SnO₂ is used as an additive.

The additive is formed in the same manner as the above described embodiment. Samples to be measured which differ in mixture ratio in a case where SnO₂ is mixed as shown in respective columns off sample numbers in Table 7 were prepared, and the dielectric constant (εr), the Q value and the temperature coefficient of resonance frequency were measured in tile neighborhood of the measurement frequency of 3 GHz with respect to the samples to be measured. Table 7 also shows the results of the measurements.

[TABLE 7]

Dielectric Properties of Ceramics of a
w · Li₂O — x · CaO — y · Nd₂O₃ — z · TiO₂
System (additive; SnO₂)

| sample number | composition ratio (mole %) w | x | y | z | additive | part by weight | εr | Q | τf |
|---|---|---|---|---|---|---|---|---|---|
| 1* | 9 | 12 | 11.5 | 67.5 | no | 0 | 122 | 750 | +15 |
| 2 | 9 | 12 | 11.5 | 67.5 | SnO₂ | 1.5 | 121 | 1050 | +13 |
| 3 | 9 | 12 | 11.5 | 67.5 | " | 3 | 117 | 1070 | +11 |
| 4 | 9 | 12 | 11.5 | 67.5 | " | 5 | 113 | 850 | −8 |
| 5 | 9 | 12 | 11.5 | 67.5 | " | 10 | 103 | 750 | −15 |
| 6* | 9 | 12 | 11.5 | 67.5 | " | 15 | 97 | 300 | — |
| 7* | 3.5 | 8 | 18 | 70.5 | no | 0 | 94 | 1550 | −2 |
| 8 | 3.5 | 8 | 18 | 70.5 | SnO₂ | 3 | 90 | 1880 | −9 |
| 9 | 3.5 | 8 | 18 | 70.5 | " | 5 | 87 | 1670 | −13 |
| 10 | 3.5 | 8 | 18 | 70.5 | " | 15 | 75 | 370 | — |

Note) In table 7 asterisked samples are samples beyond the range of the present invention, — indicates "unmeasurable", and the unit of τf is ppm/°C.

As can be seen from Table 7, the dielectric constant εr is slightly decreased, while the Q value is effectively increased by containing SnO₂. Particularly, the Q value takes maximum value when the content is in the vicinity of 3 to 5 parts by weight. However, the Q value is extremely decreased if the content exceeds 10 parts by weight.

on the other hand, the absolute value of the temperature coefficient is low, i.e., not more than 20 ppm/°C., thereby to obtain a good ceramic composition.

The ranges of w, x, y and z in the microwave dielectric ceramic composition having a composition according to the present embodiment can be respectively $0.0$ mole $\% < w \leq 25.0$ mole $\%$ $0.0$ mole $\% < x \leq 50.0$ mole $\%$ $0.0$ mole $\% < y \leq 30.0$ mole $\%$ and $0.0$ mole $\% < z \leq 80.0$ mole $\%$, where $w+x+y+z=100$ mole %.

Although in the present embodiment, the content of SnO₂ is adjusted, thereby to make it possible to obtain a dielectric suitable for a microwave band, the content is thus suitably adjusted, thereby to make it possible to make the Q value large, although the dielectric constant is slightly decreased in a state where the temperature coefficient is kept low.

Description is now made of an embodiment in which in a microwave dielectric ceramic composition expressed by a composition formula of w·LiO₂−x·CaO−y·Nd₂O₃−z·TiO₂ as in the above described embodiment, zinc oxide (ZnO), cobalt oxide (COO), nickel oxide (NiO) or magnesium oxide (MgO) is used as an additive.

The additive is formed in the same manner as in the above described embodiment. Samples to be measured which differ in mixture ratio in a case where ZnO, CoO, NiO or MgO is mixed as shown in respective columns of sample numbers in Table 8 were prepared, and the dielectric constant (εr), the Q value and the temperature coefficient of resonance frequency (τf) were measured in the neighborhood of the measurement frequency of 3 GHz with respect to the samples to be measured. Table 8 also shows the results of the measurements.

[TABLE 8]

Dielectric Properties of Ceramics of a
$w \cdot Li_2O - x \cdot CaO - y \cdot Nd_2O_3 - z \cdot TiO_2$
System (additive; ZnO, CoO, NiO, MgO)

| sample number | composition ratio (mole %) | | | | additive | part by weight | εr | Q | τf |
|---|---|---|---|---|---|---|---|---|---|
| | w | x | y | z | | | | | |
| 1* | 9 | 12 | 11.5 | 67.5 | no | 0 | 122 | 750 | +15 |
| 2 | 9 | 12 | 11.5 | 67.5 | ZnO | 1.5 | 118 | 990 | +6 |
| 3 | 9 | 12 | 11.5 | 67.5 | " | 3 | 102 | 1150 | +4 |
| 4 | 9 | 12 | 11.5 | 67.5 | " | 5 | 89 | 1220 | −15 |
| 5 | 9 | 12 | 11.5 | 67.5 | " | 10 | 74 | 920 | −25 |
| 6* | 9 | 12 | 11.5 | 67.5 | " | 15 | 56 | 550 | −38 |
| 7 | 9 | 12 | 11.5 | 67.5 | CoO | 1.5 | 118 | 960 | +13 |
| 8 | 9 | 12 | 11.5 | 67.5 | " | 3 | 104 | 1100 | +7 |
| 9 | 9 | 12 | 11.5 | 67.5 | " | 5 | 92 | 1180 | −12 |
| 10 | 9 | 12 | 11.5 | 67.5 | " | 10 | 76 | 890 | −23 |
| 11* | 9 | 12 | 11.5 | 67.5 | " | 15 | 57 | 540 | −40 |
| 12 | 9 | 12 | 11.5 | 67.5 | NiO | 1.5 | 119 | 960 | +12 |
| 13 | 9 | 12 | 11.5 | 67.5 | " | 3 | 105 | 1080 | +5 |
| 14 | 9 | 12 | 11.5 | 67.5 | " | 5 | 93 | 1130 | −17 |
| 15 | 9 | 12 | 11.5 | 67.5 | " | 10 | 78 | 860 | −28 |
| 16* | 9 | 12 | 11.5 | 67.5 | " | 15 | 58 | 520 | −42 |
| 17 | 9 | 12 | 11.5 | 67.5 | MgO | 1.5 | 114 | 1010 | +6 |
| 18 | 9 | 12 | 11.5 | 67.5 | " | 3 | 99 | 1240 | −7 |
| 19 | 9 | 12 | 11.5 | 67.5 | " | 5 | 86 | 1310 | −24 |
| 20 | 9 | 12 | 11.5 | 67.5 | " | 10 | 69 | 990 | −29 |
| 21* | 9 | 12 | 11.5 | 67.5 | " | 15 | 51 | 640 | −48 |

Note) In table 8, asterisked samples are samples beyone the range of the present invention, and the unit of τf is ppm/°C.

As can be seen from Table 8, the dielectric constant εr is slightly decreased, while the Q value is greatly increased by containing one of ZnO, CoO, NiO and MgO. Particularly, the Q value takes maximum value when the content is in the vicinity of 3 to 5 parts by weight. However, the dielectric constant εr is extremely decreased if the content exceeds 5 parts by weight.

Furthermore, the absolute value of the temperature coefficient τf is low, i.e., not more than 30 ppm/°C., thereby to obtain a good ceramic composition.

The ranges of w, x, y and z in the microwave dielectric ceramic composition having a composition according to the present embodiment can be respectively 0.0 mole % < w ≦ 25.0 mole %, 0.0 mole % ≦ x ≦ 50.0 mole %, 0.0 mole % < y ≦ 30.0 mole % and 0.0 mole % < z ≦ 80.0 mole %, where w+x+y+z=100 mole %.

In the present embodiment, the content of ZnO, CoO, NiO or MgO is adjusted, thereby to make it possible to obtain a dielectric suitable for a microwave band. The content is thus suitably adjusted, thereby to make it possible to make the Q value large, although the dielectric constant is slightly decreased in a state where the temperature coefficient is kept low.

As described in the foregoing, when the microwave dielectric ceramic composition in each of the above described embodiments of the present invention is used for, for example, a resonator, the additive may be suitably selected and used in consideration of the above described tendency in a case where the content of the additive is changed.

Furthermore, when the microwave dielectric ceramic composition according to each of the above described embodiments of the present invention is utilized for a microwave, it is fit for practical use even if the dielectric constant is low particularly when the Q value and the temperature coefficient are important design parameters.

Although in the present invention, one additive is contained, two or more types of additives as described above may be combined and contained. Also in this case, the same effect as that in the present invention can be expected, although the respective amounts of addition must be decreased.

Furthermore, although in the present invention, $MnO_2$, $Bi_2O_3$ or the like is used as the additive, selenium oxide, tellurium oxide, tungsten oxide, a rare earth oxide group or the like may be used in addition to the additive described in each of the above described embodiments. Also in this case, the same effect as that in the present invention can be expected.

Additionally, although in the invention of the present application, $Sm_2O_3$ or $Nd_2O_3$ is used as a part of a main component, the same effect can be expected with respect to a composition using $Pr_6O_{11}$, $Eu_2O_3$ or $La_2O_3$ in place of $Sm_2O_3$ or $Nd_2O_3$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a microwave dielectric ceramic composition expressed by a composition formula of $w \cdot Li_2O - x \cdot CaO - y \cdot A_2O_3 - z \cdot TiO_2$, wherein A is selected from Sm and Nd, and w, x, y and z are in the following ranges:

0.0 mole % < w ≦ 25.0 mole %,
0.0 mole % < x ≦ 50.0 mole %,
0.0 mole % < y ≦ 30.0 mole %,
0.0 mole % < z ≦ 80.0 mole %, the microwave dielectric ceramic composition being characterized in that w+x+y+z=100 mole % and more than zero to not more than 5 parts by weight of one selected from zinc oxide, cobalt oxide, nickel oxide, and magnesium oxide is contained in 100 parts by weight of $w \cdot Li_2O - x \cdot CaO - y \cdot A_2O_3 - z \cdot TiO_2$.

2. The microwave dielectric ceramic composition according to claim 1, wherein more than zero to not more than 3 parts by weight of one selected from zinc oxide, cobalt oxide, nickel oxide, and magnesium oxide is contained in 100 parts by weight of $w \cdot Li_2O - x \cdot CaO - y \cdot A_2O_3 - z \cdot TiO_2$.

* * * * *